April 10, 1962  J. A. CLARK ET AL  3,028,791
VARIABLE POWER SPOTTING TELESCOPE
Filed July 21, 1960

INVENTORS
JAMES A. CLARK
BY MICHAEL KRAJOWSKY

Frank C. Parker
ATTORNEY 3,028,791
VARIABLE POWER SPOTTING TELESCOPE
James A. Clark, Brighton, and Michael Krajewsky, Rochester, N.Y., assignors to Bausch & Lomb Incorporated, Rochester, N.Y., a corporation of New York
Filed July 21, 1960, Ser. No. 44,459
5 Claims. (Cl. 88—32)

The present invention relates to telescopes and more particularly to the type of telescopes suitable for hand use in spotting such items as birds, etc.

The present invention has for a particular object the provision of a new and improved telescope of the aforementioned general type including a lens mounting housing disposed at one side of the main tubular telescope casing for facilitating assembly, cleaning and adjustment of the lens mechanism.

A further object of the present invention is to provide an improved form of variable power or zoom type of telescope wherein a pair of longitudinally movable erecting lens elements are slidably positioned by means of a pair of rotatable cams in order to selectively vary the magnification provided by the telescope.

The foregoing objects and others as well as numerous advantages of the present invention will become more apparent from the following detailed description thereof, when read in conjunction with the accompanying drawing, wherein.

Figure 1:
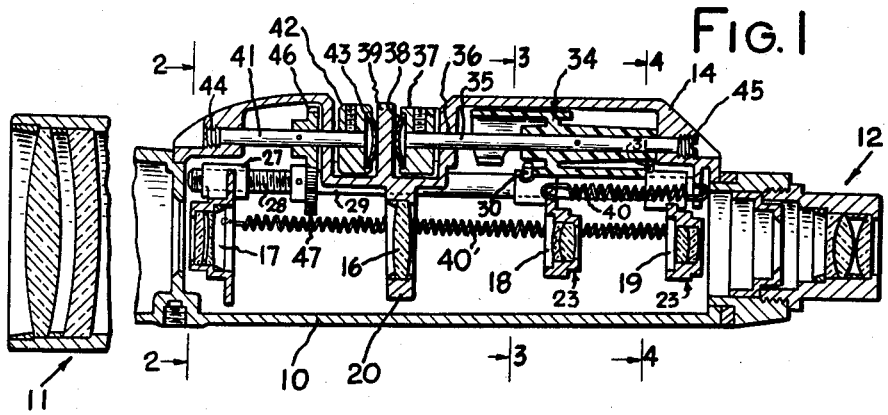
FIG. 1 is a side elevational view shown in section and showing the principal features of the invention.
Figure 3:
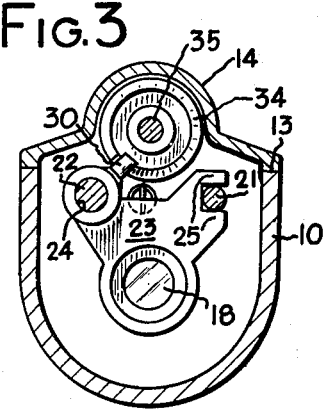
FIG. 3 is a sectional view taken substantially along the line 3—3 in FIG. 1 and looking in the direction of the arrows.
Figure 4:
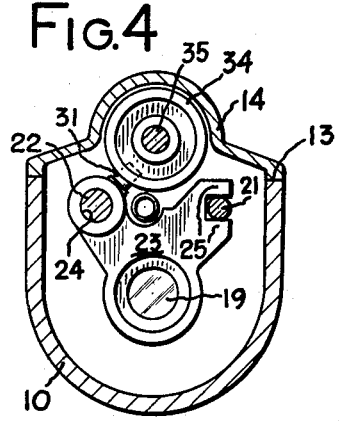
FIG. 4 is a sectional view taken substantially along the line 4—4 in FIG. 1 and looking in the direction of the arrows.
Figure 5:
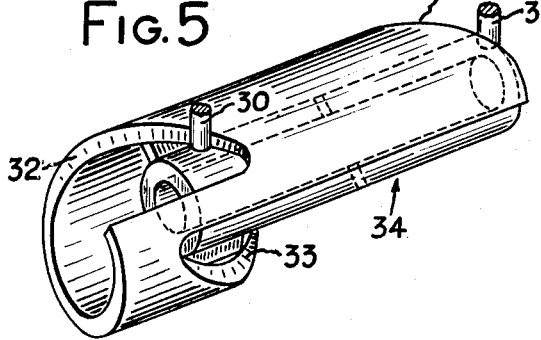
FIG. 5 is a perspective view of the control cam mechanism for controlling the position of the erecting lenses.
Figure 2:
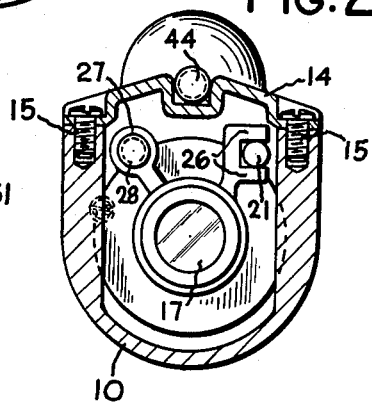
FIG. 2 is a sectional view taken substantially along the line 2—2 in FIG. 1 and looking in the direction of the arrows.

With reference now to the drawing, wherein like reference numerals in the different views have been used to identify identical parts, the telescope comprising the subject matter of the present invention comprises a generally tubular casing 10 formed with an objective 11, comprising a plurality of lens elements at one end and an ocular or eyepiece 12 threaded into the other end of the tubular casing 10.

The tubular casing 10 is open along one side, as indicated by reference numeral 13, and a removable housing 14 is securely fastened thereto by means of a plurality of mounting bolts 15 which extend through openings in the housing 14 into threaded openings in the casing 10. The housing 14 includes means for mounting a relatively stationary ray converging lens element 16, a movable focusing lens element 17, and a pair of movable erecting lens elements 18 and 19. All of the lens elements 16, 17, 18 and 19 are disposed in optical alignment with the ocular 12 and objective 11, and the erecting lens elements 18 and 19 are both longitudinally reciprocable in order to effect variable magnification or zooming of the image provided by the telescope.

The stationary converging lens 16 is mounted within an encircling collar or mount 20 which is formed as an integral part of the housing 14. A pair of rods 21 and 22 are provided for mounting the erecting lenses 18 and 19, the rod 21 extending through the housing and providing one mounting point for the focusing lens 17.

Each of the erecting lenses 18 and 19 is mounted within a mounting member 23, each mounting member 23 being formed with a journal 24 slidable on shaft 22 and a pair of projecting portions 25 cooperable with shaft 21 in order to maintain the lenses 18 and 19 in parallelism with the rods 21 and 22.

The focusing lens 17 is also provided with a pair of projecting portions 26 cooperable with shaft 21 and a threaded sleeve portion 27 threadedly receives a threaded portion 28 on a control shaft 29 mounted for rotation within the housing 14. Upon rotation of the shaft 29 the focusing lens 17 is movable longitudinally in order to bring the image into focus for the particular observer using the telescope.

Each of the mounts 23 for the erecting lenses 18 and 19 is provided with a pin 30 and 31 respectively, which pins 30 and 31 respectively cooperate with the left and right hand edges 32 and 33 of double-ended cam 34. The double-ended cam 34 is fixedly mounted upon a control shaft 35 which projects through an opening 36 toward a depression in the center of the housing 14. A knob 37 is keyed to the shaft 35 and the shaft and knob are forced rightwardly by means of a spring member 38 which abuts a projection 39 formed on housing 14 in order to hold the cam 34 in the proper axial position. By merely rotating the knob 37 and, in turn, the shaft 35 and cam 34, the positions of the erecting lenses 18 and 19 are changed in accordance with the degree of rotation of the cam. A pair of tension springs 40 and 40' respectively urge the erecting lenses 18 and 19 against the cam surfaces 32 and 33.

Means for rotating the focusing lens control shaft 29 comprises a second shaft 41 rotatably mounted within the housing 14 and projecting through an opening toward the depression in the center of the housing 14, the shaft 41 likewise being formed with a control knob 42 and a spring member 43 which acts against projection 39 to urge the shaft 31 toward the left. Set screws 44 and 45 are respectively provided for adjusting the positions of the shafts 41 and 35. A gear 46 is keyed to shaft 41 and meshes with a gear 47 keyed to shaft 29 so that upon rotation of the knob 42, the threaded portion 28 of shaft 29 will likewise be rotated in order to effect focusing adjustment of the focusing lens mechanism 17.

In the operation of the present telescope, all that is necessary to focus the same is to manually adjust knob 42 in order to select the proper setting of the focusing lens 17. In order to select the desired degree of magnification, it is only necessary to manually adjust knob 37 and this has the effect of properly positioning the erecting lenses 18 and 19 to correspond with the desired degree of magnification.

By providing the focusing lens means 17 and the erecting lens means 18 and 19 within the housing 14, the telescope has been greatly simplified as it is only necessary to remove the housing 14 from the casing 10 and practically all of the working parts of the telescope are in a position to be worked upon in the event adjustment or reconditioning may be required.

It is contemplated that numerous changes and modifications may be made in the present invention without departing from the spirit or scope thereof.

What is claimed is:

1. A variable power telescope comprising a generally elongate hollow casing having optically aligned objective and ocular lens means respectively disposed at the opposite ends of the casing, a removable housing disposed along one side of said casing and including rod means mounting focusing lens means and variable power erecting lens means in optical alignment between said objective and ocular lens means, said rod means extending longitudinally with respect to said housing and substantially parallel to the optical axis of the telescope for slidably mounting said erecting lens means and said focusing lens means, control means including a pair of rotatable control shafts for respectively effecting controlled slidable adjustment of said focusing lens means and said variable power erecting lens means along said rod means for varying the magnification afforded by the telescope, each of said control shafts projecting toward each other through openings formed in said housing, and a pair of adjacent manually operable control knobs respectively mounted on said projecting ends of said control shafts for respectively effecting adjustment of said focusing and said variable power erecting lens means.

2. A variable power telescope comprising a generally elongate hollow casing having optically aligned objective and ocular lens means respectively disposed at the opposite ends of the casing, a removable housing disposed along one side of said casing and including rod means mounting focusing lens means and variable power erecting lens means in optical alignment between said objective and ocular lens means, said rod means extending longitudinally with respect to said housing and substantially parallel to the optical axis of the telescope for slidably mounting said erecting lens means and said focusing lens means, control means including a pair of rotatable control shafts respectively having screw means and cam means drivingly connected therewith for effecting controlled slidable adjustment of said focusing lens means and said variable power erecting lens means along said rod means for varying the magnification afforded by the telescope, and a pair of manually operable control knobs respectively drivingly connected with said control shafts for actuating said screw means and said cam means.

3. A variable power telescope comprising a generally elongate hollow casing having optically aligned objective and ocular lens means respectively disposed at the opposite ends of the casing, a removable housing disposed along one side of said casing and including rod means mounting focusing lens means and variable power erecting lens means in optical alignment between said objective and ocular lens means, said rod means extending longitudinally with respect to said housing and substantially parallel to the optical axis of the telescope for slidably mounting said erecting lens means and said focusing lens means, control means including a pair of longitudinally aligned rotatable control shafts respectively having screw means and cam means drivingly connected therewith for effecting controlled slidable adjustment of said focusing lens means and said variable power erecting lens means along said rod means for varying the magnification afforded by the telescope, one end of each of said control shafts being adjacent each other and respectively extending through openings formed in said housing, and a pair of adjacent manually operable control knobs respectively mounted on said projecting ends of said control shafts for respectively effecting adjustment of said focusing and said variable power erecting lens means.

4. A variable power telescope comprising a generally elongate hollow casing having optically aligned objective and ocular lens means respectively disposed at the opposite ends of the casing, a removable housing disposed along one side of said casing and including rod means mounting focusing lens means and variable power erecting lens means in optical alignment between said objective and ocular lens means, said rod means extending longitudinally with respect to said housing and substantially parallel to the optical axis of the telescope for slidably mounting said erecting lens means and said focusing lens means, control cam means respectively cooperable with said variable power erecting lens means and including spring means for retaining said erecting lens means operably engaged with said cam means, and manual means for actuating said cam means for selectively effecting controlled slidable adjustment of said erecting lens means along said rod means for selectively varying the magnification afforded by the telescope.

5. A variable power telescope comprising a generally elongate hollow casing having optically aligned objective and ocular lens means respectively disposed at the opposite ends of the casing, a removable housing disposed along one side of said casing and including rod means mounting focusing lens means and variable power erecting lens means in optical alignment between said objective and ocular lens means, said rod means extending longitudinally with respect to said housing and substantially parallel to the optical axis of the telescope for slidably mounting said erecting lens means and said focusing lens means, control means including a pair of longitudinally aligned rotatable control shafts respectively having screw means and cam means drivingly connected therewith for respectively effecting controlled slidable adjustment of said focusing lens means and said variable power erecting lens means along said rod means for varying the magnification afforded by the telescope, said control means including spring devices for retaining said erecting lens means in operable engagement with said cam means, one end of each of said control shafts being adjacent each other and respectively extending through openings formed in the housing, and a pair of adjacent manually operable control knobs respectively mounted on said projecting ends of said control shafts for respectively effecting adjustment of said focusing and said variable power erecting lens means.

References Cited in the file of this patent

UNITED STATES PATENTS

| | | |
|---|---|---|
| 812,464 | Swasey | Feb. 13, 1906 |
| 2,165,341 | Capstaff et al. | July 11, 1939 |
| 2,532,684 | Walker | Dec. 5, 1950 |
| 2,766,658 | Schwesinger | Oct. 16, 1956 |
| 2,942,519 | Boughton et al. | June 28, 1960 |

FOREIGN PATENTS

| | | |
|---|---|---|
| 21,621 | Great Britain | of 1913 |
| 283,865 | Italy | Mar. 25, 1931 |